A. B. RONEY.
FLYING MACHINE.
APPLICATION FILED DEC. 8, 1919.

1,348,743.

Patented Aug. 3, 1920.
2 SHEETS—SHEET 1.

Witnesses:
Harry R. L. White.
W. P. Kilroy.

Inventor:
Alexander B Roney

A. B. RONEY.
FLYING MACHINE.
APPLICATION FILED DEC. 8, 1919.
1,348,743.
Patented Aug. 3, 1920.
2 SHEETS—SHEET 2.
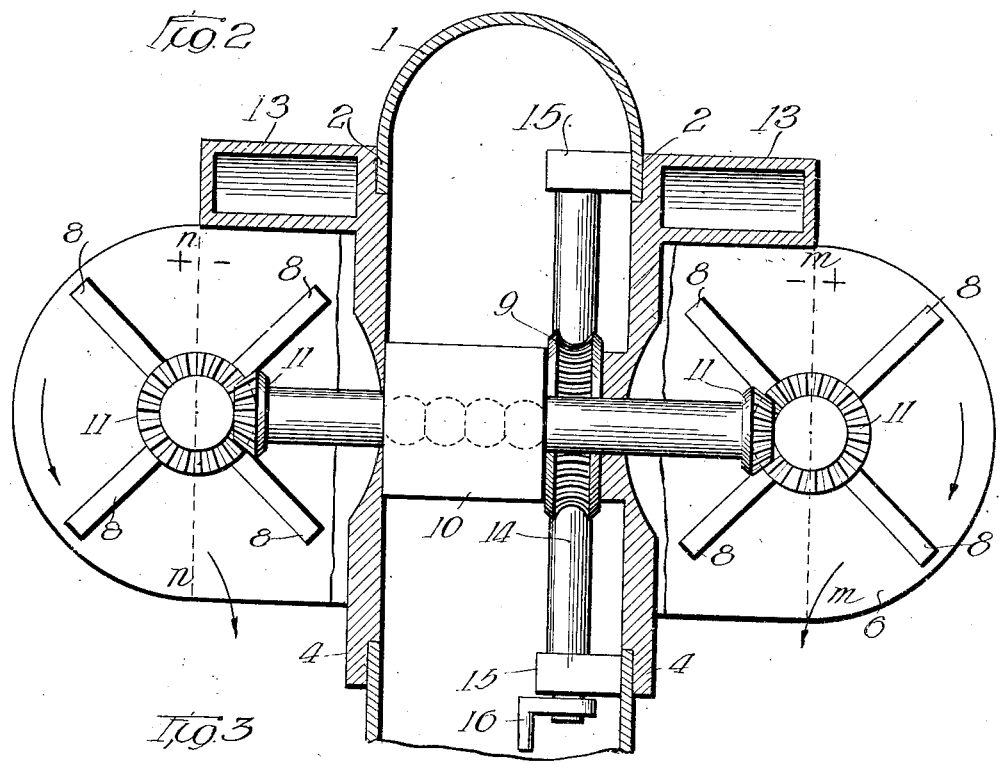
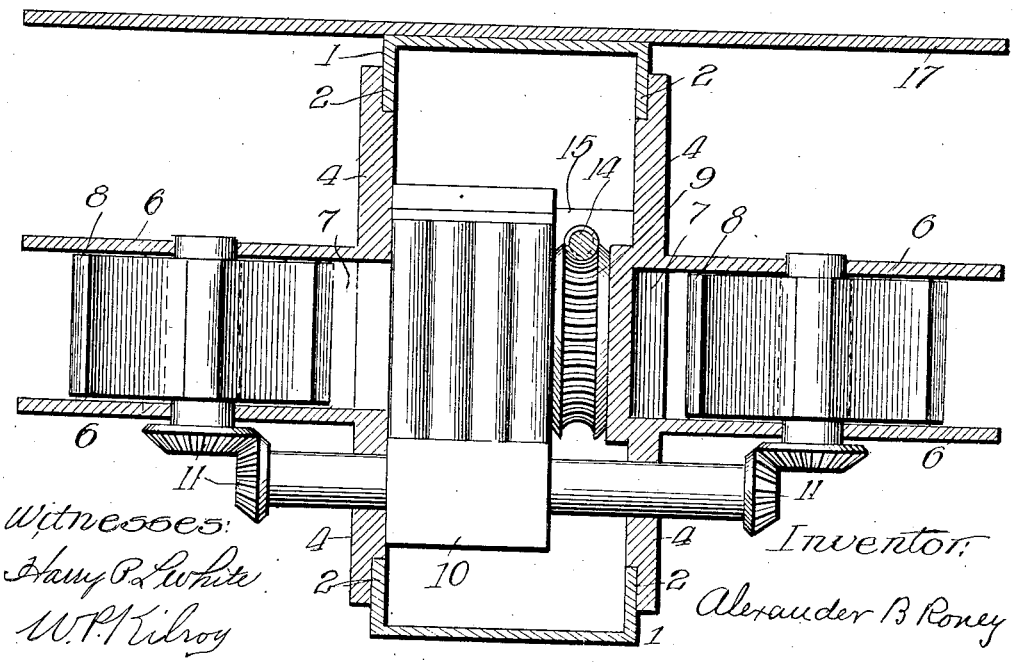
Witnesses:
Harry P. White
W. P. Kilroy
Inventor:
Alexander B. Roney

UNITED STATES PATENT OFFICE.

ALEXANDER B. RONEY, OF CHICAGO, ILLINOIS.

FLYING-MACHINE.

1,348,743.   Specification of Letters Patent.   Patented Aug. 3, 1920.

Application filed December 8, 1919.   Serial No. 343,369.

*To all whom it may concern:*

Be it known that I, ALEXANDER B. RONEY, a citizen of the United States, residing at Chicago, county of Cook, and State of Illinois, have invented new and useful Improvements in Flying-Machines, of which the following is a specification.

The purpose of this invention is to eliminate from air-craft propulsion, the use of the screw propeller, and substitute therefor, the paddle wheel propeller.

Fig. 2, shows a cross section of the fuselage portion of Fig. 1, on the line $d$—$d$, looking in the direction of the arrows, to expose to view, the outlines of the one-piece propeller and motor assembly referred to elsewhere.

Fig. 3, shows a cross section of the fuselage portion of Fig. 1, on the line $a$—$a$, viewed in the direction of the arrows.

Figure 1:
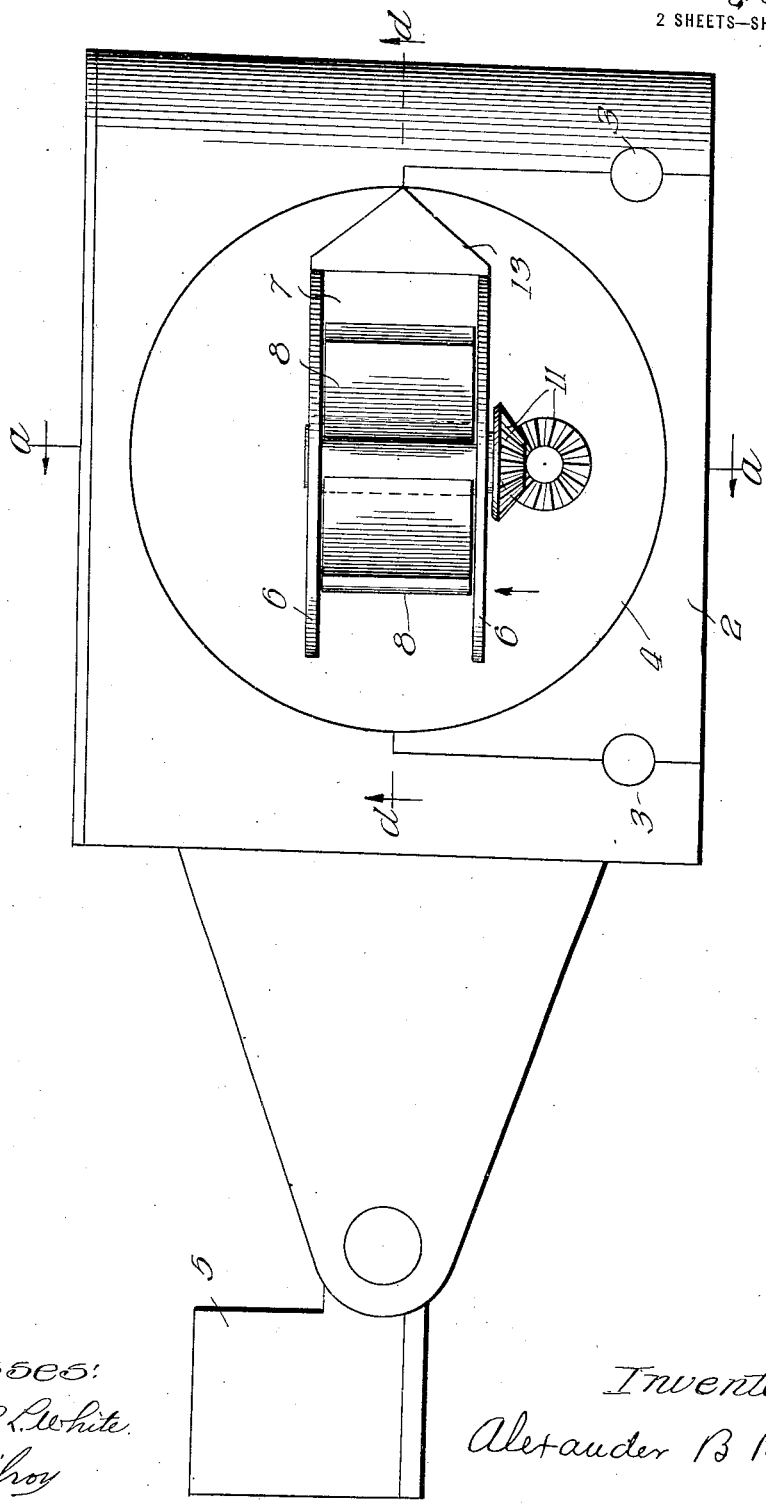
Figure 1, is a longitudinal side view in elevation of my new flier, equipped with paddle wheel propellers.

A handle 16, engages screw worm 14, which is journaled revolubly in the hangers 15, 15 that project from the body of the fuselage, and which engages the worm wheel 9, carried on the shaft portion of the ring bearings 4, 4, as is also the motor 10, and it can be seen that the plane of the ring bearings 4, 4 serve as a part of the side walls of said fuselage body, to inclose these parts within the body of the fuselage proper. External of said fuselage body 1, the said ring bearings 4, 4 carry the propeller frames 6, 6 having conduits 7, 7, that are provided with air deflecting hoods 13, 13 and they project laterally from the sides of the rings 4, 4. In the conduits 7, 7 between the walls 6, 6 of the propeller frames, the paddle propeller wheels 8, 8 are revolubly mounted with their shaft parts in bevel gear mesh with the motor's drive shaft gears 11, 11.

The cap plane 17 and rudder part 5, together with the removable fuselage segment 2, is used for a split bearing to assemble the rings 4, 4 to the fuselage body 1, and which is adapted to be secured to said body by the wedges 3, 3.

The power used to revolve the propellers 8, 8 is transmitted from the motor 10, through the bevel gears 11, 11 and when said propellers are speeded up enough for the cap plane 17 to take the air, the operator, by means of handle 16, turns the propeller frames until their air deflector hoods 13, 13 point in the direction of travel desired. Then the said deflectors, while the machine is moving, deflect the air, so that the effective air slap of the propeller paddles in the direction of travel is positive on one side of lines M—M, and N—N, as indicated by the arrows, and negative on the other. It would not be correct to say that the said deflectors point in the direction of travel, when the machine is descending to earth under control of the motor throttled by the operator; as a matter of fact they point the opposite way.

I claim:

An aeroplane fuselage in combination, a one-piece propeller and motor assembly comprising lateral propeller frames, each frame pivotally shouldered to opposite sides of said fuselage, worm-gear adjusting means for said propeller frames, paddle wheel propellers pivotally mounted in said frames and driving means for said propellers.

ALEXANDER B. RONEY.

Witnesses:
LILLIAN E. LE CLAIRE,
OTTO J. RODENBERGH.